United States Patent
Nojiri et al.

(10) Patent No.: US 8,462,285 B2
(45) Date of Patent: Jun. 11, 2013

(54) SCANNING LINE DRIVING CIRCUIT FOR ACTIVE MATRIX AND IMAGE DISPLAY DEVICE

(75) Inventors: Isao Nojiri, Tokyo (JP); Hiroyuki Murai, Tokyo (JP); Takashi Miyayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1204 days.

(21) Appl. No.: 12/342,215

(22) Filed: Dec. 23, 2008

(65) Prior Publication Data

US 2009/0174695 A1 Jul. 9, 2009

(30) Foreign Application Priority Data

Jan. 8, 2008 (JP) .................................. 2008-001204

(51) Int. Cl.
*G02F 1/136* (2006.01)
(52) U.S. Cl.
USPC ............................................ 349/43; 345/206
(58) Field of Classification Search
USPC .............................................. 349/43; 345/206
See application file for complete search history.

(56) References Cited

U.S. PATENT DOCUMENTS

2004/0141128 A1* 7/2004 Kim et al. ..................... 349/138
2007/0085962 A1 4/2007 Yoshioka

FOREIGN PATENT DOCUMENTS

| JP | 62-252964 | 11/1987 |
| JP | 11-142871 | 5/1999 |
| JP | 11-281992 | 10/1999 |
| JP | 2007-108470 | 4/2007 |

OTHER PUBLICATIONS

Japanese Office Action issued Jun. 12, 2012, in Patent Application No. 2008-001204 (with English-language translation).
Jin Young Choi et al., "P-218L: Late-News Poster: A Compact and Cost-efficient TFT-LCD through the Triple-Gate Pixel Structure", SID 06 Digest pp. 274-276.

* cited by examiner

*Primary Examiner* — Lucy Chien
(74) *Attorney, Agent, or Firm* — Oblon, Spivak, McClelland, Maier & Neustadt, L.L.P.

(57) ABSTRACT

A first contact hole formed in a gate driving circuit is covered with an electrically conductive oxide film formed to be connected to the first contact hole and having a first pattern. The periphery of the electrically conductive oxide film is surrounded by an electrically conductive oxide film (a sacrifice electrode) formed simultaneously with the electrically conductive oxide film and having a second pattern form.

14 Claims, 12 Drawing Sheets

SCANNING LINE DRIVING CIRCUIT FOR ACTIVE MATRIX AND IMAGE DISPLAY DEVICE

This application claims priority from Japanese Patent Application No. 2008-001204 filed on Jan. 8, 2008, the entire subject matter of which is incorporated herein by reference.

BACKGROUND OF THE INVENTION

1. Field of the Invention

The present invention relates a scanning line driving circuit for an active matrix and a structure of an image display device, and more particularly to a scanning line driving circuit for an active matrix and an image display device preferably applied to a liquid crystal display device that employs an amorphous silicon thin film transistor in a scanning line driving circuit having a contact hole.

2. Description of the Related Art

In an image display panel of a liquid crystal display device having a scanning line driving circuit for an active matrix, as a gate line driving circuit (a scanning line driving circuit) for scanning the display panel, a shift register can be used that carries out a shift operation of making a round in one frame period of a display signal. The shift register is desirably formed with only the same conductive type field effect transistors in order to reduce the number of processes in a production process of the display device.

The liquid crystal display device in which the shift register of the gate line driving circuit is formed with the amorphous silicon thin film transistors (refer it to as "a-Si TFT", hereinafter) is easy in its enlargement of an area and high in its productivity, and is used for a screen of, for instance, a notebook type PC, a personal digital assistant (PDA), a multimedia player (PMP), a simple car navigation system (PND: Personal Navigation Device) or the like (see Jin Young Choi, Jin Jeon, Jong Heon Han, Seob Shin, Se Chun Oh, Jun Ho Song, Kee Han Uh, and Hyung Guel Kim, "A Compact and Cost-efficient TFT-LCD through the Triple-Gate Pixel Structure", pp. 274 to 276, SID '06 DIGEST).

Further, in order to make the frame of an active matrix liquid crystal display panel narrow, the gate line driving circuit needs to be arranged in the vicinity of a seal material formed so as to surround the peripheral edge of the liquid crystal display panel or a part of the driving circuit needs to be arranged under the seal material.

The gate line driving circuit has many contact holes for connecting different kinds of metal wirings. The contact holes serve to electrically connect together a first metal thin film and a second metal thin film formed in different layers. The contact hole is formed on the first metal thin film and the contact hole is formed on the second metal thin film, and both the contact holes are bridged by an electrically conductive film between them.

As a material of the electrically conductive film for connecting together the metal wirings opened by the contact holes, a transparent electrically conductive film such as ITO is ordinarily used. Since the ITO film is inferior in its coverage property (see JP-A-11-281992), the metal thin film is not covered with the transparent electrically conductive film in a part of the contact holes, so that the metal thin film is exposed in some parts.

Since the part near the inner part of the seal material or under the seal material is liable to receive an influence of water, impurities or the like, the metal thin film comes into contact with the water, the impurities or the like in the part inferior in the coverage property due to the contact hole formed in the vicinity of the inner part of the seal material or under the seal material. Then, a wiring, a terminal, an electrode, etc. made of the metal thin film are corroded due to an oxidation (a corrosion phenomenon of the metal wiring or the like near the contact hole is called a contact hole corrosion, hereinafter).

Further, the inferior coverage property of the ITO film arises with an extremely high frequency especially when a process is employed in which the ITO film is formed with an amorphous material and then crystallized. Ordinarily, for a pattern process of the ITO film, a wet etching process by chemicals is frequently used. In the case of a crystalline ITO film, as the chemicals used in the wet etching process, a strong acid composed of aqueous solution of hydrochloric acid+nitrate needs to be used. In such a case, when the metal thin films such as Al, Ag or Mo coexist as a gate signal line, a source signal line or a reflection electrode, there is a fear that the metal thin films are corroded and disconnected during the wet etching process of the ITO film.

In contrast, in the case of an amorphous ITO film, the wet etching process can be carried out by a weak acid such as aqueous solution of oxalate. Therefore, even when the metal thin films such as Al, Ag or Mo coexist, the metal thin films are not corroded and disconnected. Accordingly, a process is preferably used in which the ITO film is initially formed under an amorphous state, a pattern process is carried out by using etching solution composed of oxalic acid, then, the ITO film is crystallized by using, for instance, a heating unit and finally chemically stabilized.

However, when the phase of the ITO film changes from the amorphous state to the crystalline state, a volumetric shrinkage (a distance between crystalline atoms is narrowed) arises due to the change of an irregular arrangement structure to a regular arrangement of the atoms. Therefore, since a tensile stress from a substrate is applied to the ITO film, a stage cut and disconnection of the ITO film is apt to arise especially in a step part such as the contact hole. As described above, it is preferable in view of etching to cover the contact hole with the amorphous ITO film, however, the covering or coating property of the ITO film is not good. Accordingly, the contact hole corrosion may be occasionally caused owing to the entry of water or impurities.

Specially, in the case of the gate line driving circuit formed with the a-si TFT, for instance, when it is assumed that a High voltage is 24V and a Low voltage is −6V, a potential difference is 30V so that a signal amplitude in this circuit is very large. When the gate driving circuit is operated under an environment of high temperature and high humidity, a serious problem arises that what is called an electrolysis reaction occurs due to the potential difference and the metal wiring exposed due to the inferior coverage property of the contact hole is corroded as a result of application of a high potential thereto.

SUMMARY OF THE INVENTION

The present invention is devised to solve the above-described problems and it is an object of the present invention to provide a scanning line driving circuit for an active matrix and an image display device that can suppress the corrosion of a metal wiring in the vicinity of a contact hole even when the scanning line driving circuit is operated under an environment of high temperature and high humidity.

A scanning line driving circuit for an active matrix according to the present invention is formed on an array substrate, comprises a first contact hole formed in the driving circuit; one electrically conductive oxide film formed to be connected to the first contact hole and occupying a first pattern form so as to cover the first contact hole and the other electrically conductive oxide film formed simultaneously with the one electrically conductive oxide film and occupying a second pattern form, and is characterized in that the other electrically conductive oxide film is formed so as to surround the periphery of the one electrically conductive oxide film.

The structure of the scanning line driving circuit for an active matrix of the present invention is employed, so that the scanning line driving circuit for the active matrix can be obtained which can suppress the corrosion of the metal wiring in the vicinity of the contact hole even when the scanning line driving circuit is operated under the environment of the high temperature and high humidity.

DETAILED DESCRIPTION OF THE PREFERRED EMBODIMENTS

Figure 1:
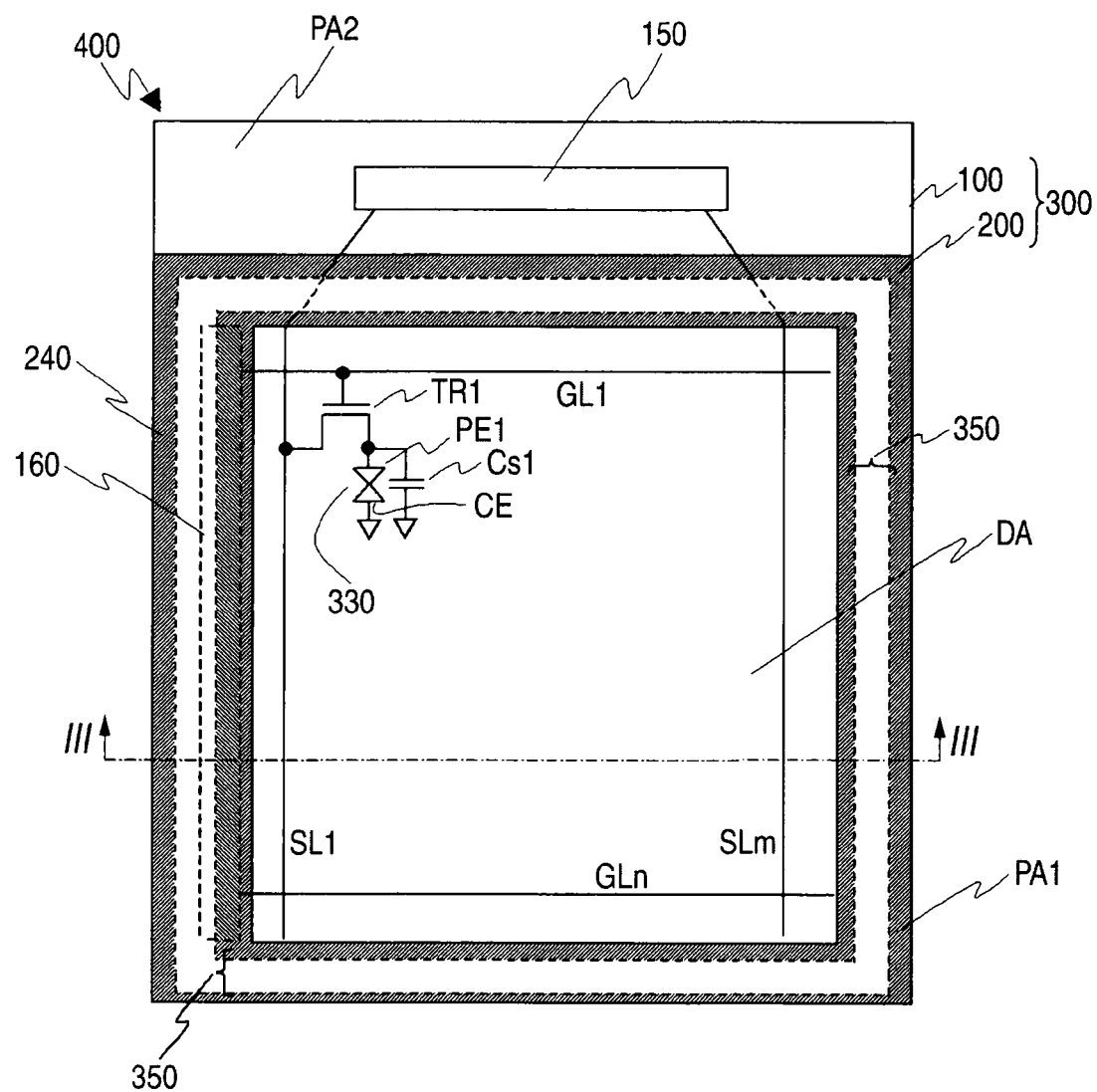
FIG. 1 is a plan view of a liquid crystal display device according to a first to fifth embodiments of the present invention.

Now, embodiments of the present invention will be described below by referring to the drawing. To avoid an explanation from being duplicated and redundant, elements having the same or equivalent functions in the drawings are respectively designated by the same reference numerals.

First Embodiment

Figure 2:
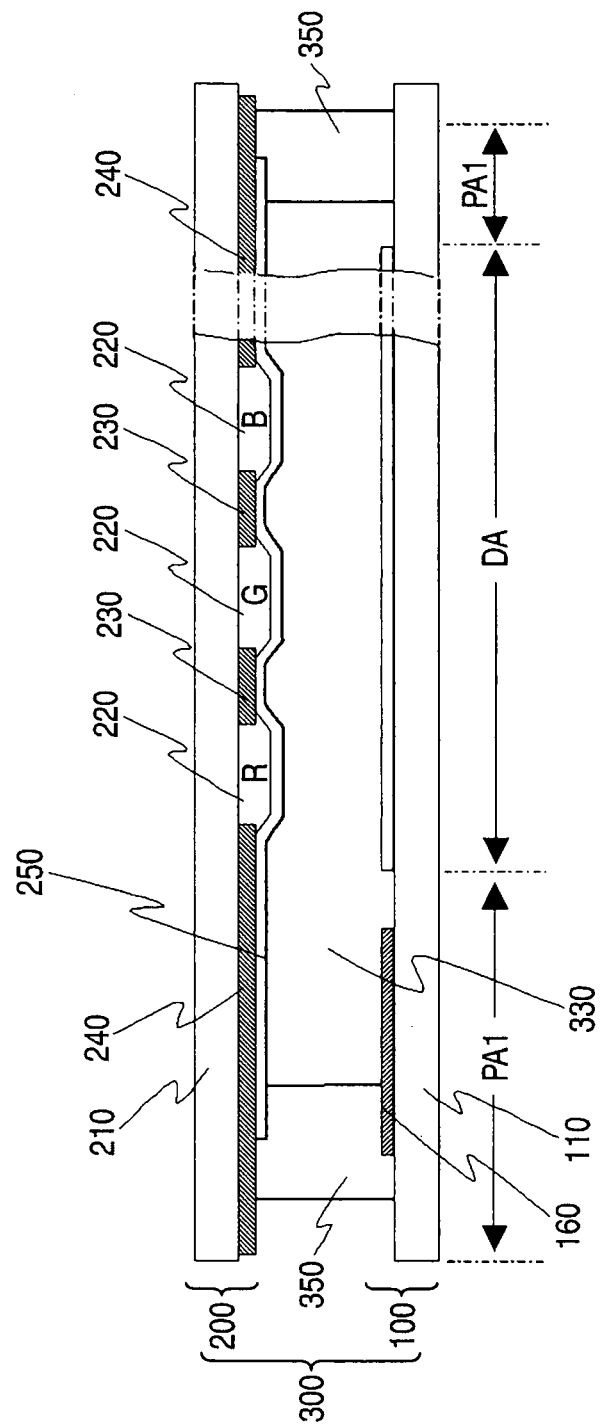
FIG. 2 is a sectional view of the liquid crystal display device according to the first to the fourth embodiments of the present invention.

FIG. 1 is a plan view of a display device according to a first embodiment. FIG. 2 is a sectional view taken along a line III-III of FIG. 1. As shown in FIG. 1, the display device 400 according to this embodiment includes a display panel 300 for an active matrix, a source line driver IC 150 provided in the display panel 300 to output driving signals respectively and a gate line (a scanning line) driving circuit 160. Incidentally, the gate line driving circuit 160 functions as an example of a scanning line driving circuit for an active matrix.

Further, the display panel 300 includes an active matrix array substrate having a first substrate 110, a plurality of gate lines (scanning lines: GL1 to GLn) arranged on the substrate, a plurality of source lines (SL1 to SLm) intersecting the gate lines so as to be insulated from them, a plurality of pixel electrodes PE arranged on the intersecting parts and thin film transistors (refer them to as TFTs, hereinafter) for driving the pixel electrodes PE, a color filter substrate 200 opposed to the array substrate 100, a liquid crystal layer 330 sandwiched between the array substrate 100 and the color filter substrate 200 and a seal material 350 for holding the liquid crystal layer 330 to connect the array substrate 100 to the color filer substrate 200.

The outputs of the source line drive IC 150 are respectively connected to the source lines (SL1 to SLm) to apply source driving signals to the source lines respectively. Similarly, the outputs of the gate line driving circuit 160 are respectively connected to the gate lines (GL1 to GLn) to apply gate driving signals to the gate lines respectively. On a surface of the color filter substrate 200 opposed to the array substrate 100, an opposed electrode CE is formed so that a light transmittance of the liquid crystal layer 330 is controlled by an electric field generated between the electrode CE and the pixel electrode PE. Further, between a drain electrode of the TFT and a common electrode (not shown in the drawing), an auxiliary capacity Cs is arranged for each pixel.

In FIG. 1, a connection diagram of a pixel electrode PE1 arranged in the intersecting part of the first gate line GL1 and the first source line SL1, a TFT (TR1), the opposed electrode CE and the auxiliary capacity Cs1 is especially shown among a plurality of pixels arranged in the form of a matrix correspondingly to a display area DA for displaying an image, and a connection diagram of other pixel is the same as the above diagram.

The display panel 300 includes the display area DA, a first peripheral area PA1 arranged so as to surround the display area DA and a second peripheral area PA2 externally adjacent to the first peripheral area PA1.

As described above, on the first substrate 110 included in the array substrate 100, the first to the n th gate lines GL1 to GLn and the first to the m th source lines SL1 to SLm are formed correspondingly to the display area DA.

Further, the gate electrode of the first TFT (TR1) of the plurality of TFTs is electrically connected to the first gate line GL1. The source electrode of the first TFT (TR1) is electrically connected to the first source line SL1. The drain electrode of the TFT (TR1) is connected to a first pixel electrode PE1 of the plurality of pixel electrodes and a first auxiliary capacity Cs1.

As shown in FIG. 2, on the second substrate 210 included in the color filter substrate 200 and corresponding to the display area DA, color filter layers 220 including red, green and blue color pixels R, G and B and first light shield layers 230 formed between the two adjacent color pixels of the red, green and blue pixels. Further, on the second substrate 210 corresponding to the peripheral area PA1, a second light shield layer 240 is arranged adjacently to the first light shield layer 230.

Further, on the color filter layers 220, the first light shield layers 230 and a part of the first light shield layer, a transparent electrode (ITO film) 250 is provided. This transparent electrode 250 applies a voltage to the liquid crystal layer as an opposed electrode to the pixel electrodes.

In contrast, in the second peripheral area PA2, the first substrate 110 is extended (upward in the example shown in FIG. 1) to be longer than the second substrate 210 and the source driver IC 150 is mounted. The first driving signals outputted from the source line driver IC 150 include a first to a m th source signals and are respectively applied to the first to the m th source lines SL1 to SLm through a plurality of source line leading out wirings formed in the second peripheral area PA2.

In contrast, in one side (a left side in FIG. 1) of the frame shaped first peripheral area PA1, the gate line driving circuit 160 is arranged that is formed by the same process as a process for forming the plurality of TFTs and the display area DA at the same time. The gate driving circuit 160 is partly arranged under the seal material 350. The gate line driving circuit 160 is electrically connected to the first to the n th gate lines GL1 to GLn formed on the gate line driving circuit 160. The second driving signals outputted from the gate line driving circuit 160 include a first to a n th gate signals (OUT 1 to OUT n) and the first to the n th gate signals are applied to the first to the n th gate lines GL1 to GLn.

In the color filter substrate 200 and the array substrate 100, a surface on which the color filter layers 220 or the opposed electrodes CE are formed is opposed to a surface on which the display area DA is formed, and the color filter substrate 200 and the array substrate 100 sandwich the seal material 350 for bonding together the two substrates and the liquid crystal layer 330 between them.

On the color filter substrate 200 and the array substrate 100, orientation films are formed (not shown in the drawing).

Figure 3:
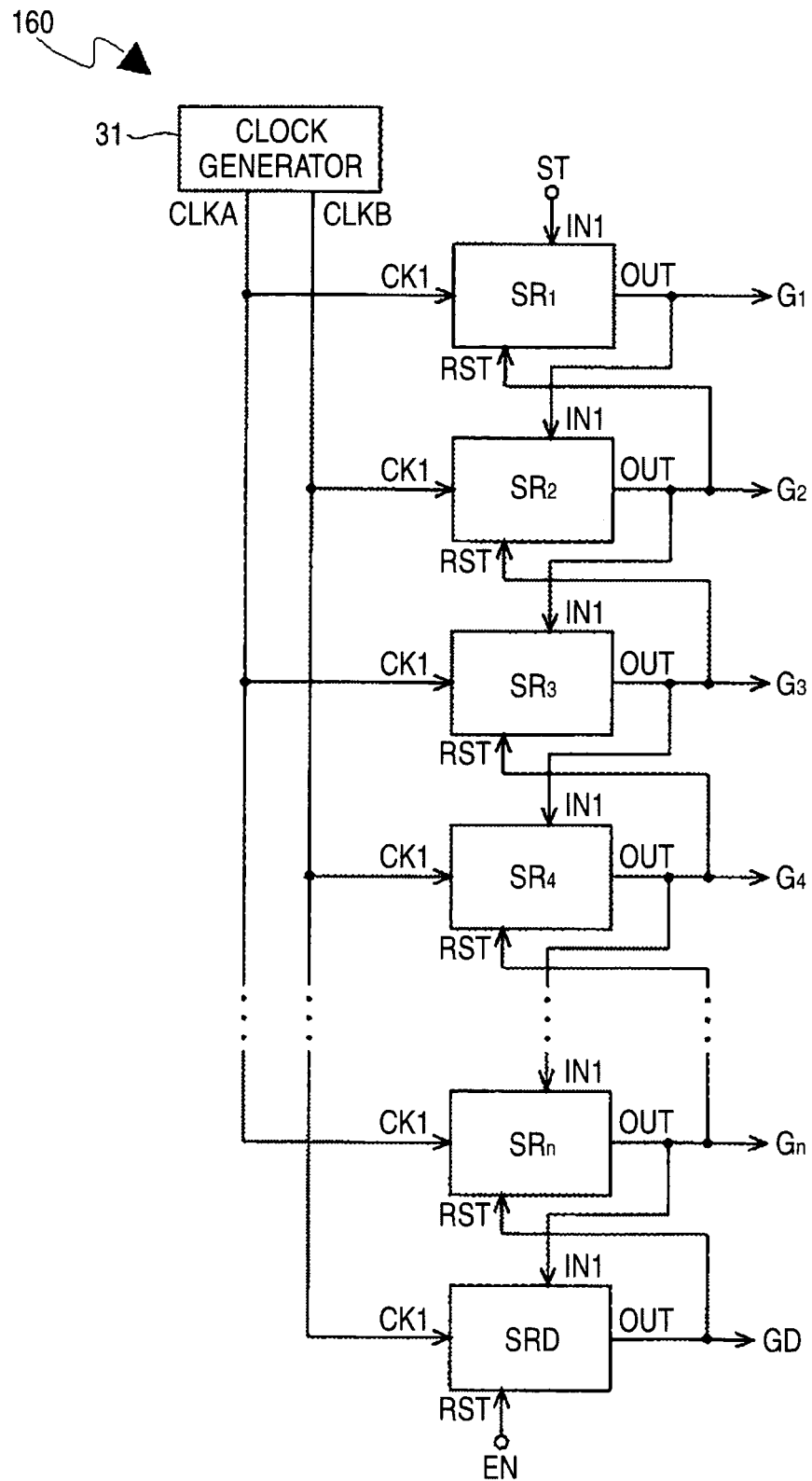
FIG. 3 is a structural view of a gate line driving circuit shown in FIG. 1.
Figure 4:
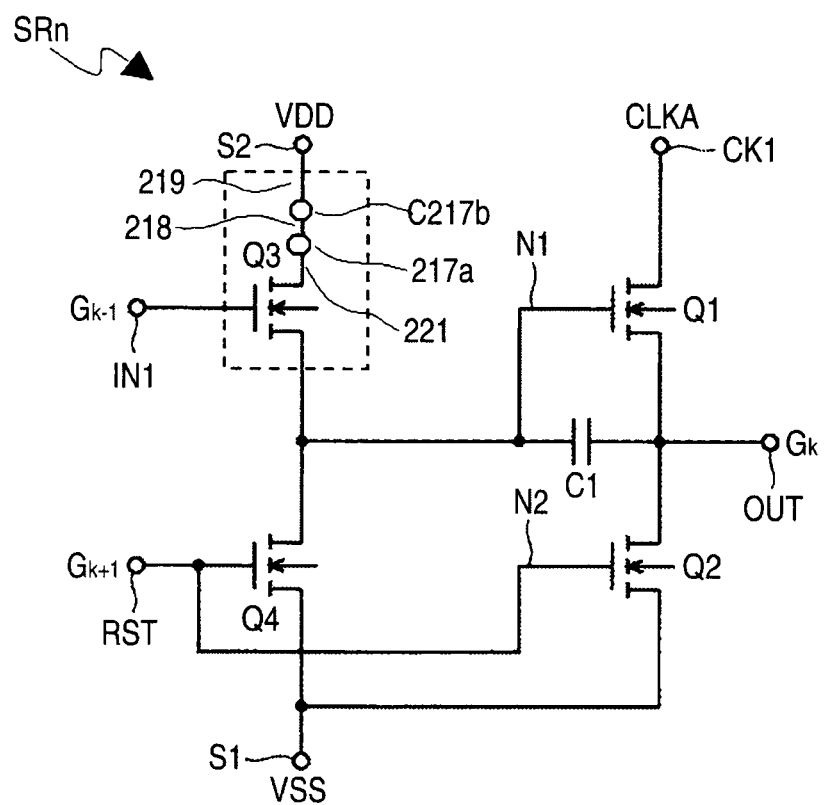
FIG. 4 is a circuit diagram of one stage of a shift register shown in FIG. 3.

Now, a circuit structure and an operation of the gate line driving circuit 160 will be described below in detail by using FIGS. 3 to 7. FIG. 3 is a diagram showing the structure of a plurality of stages of a shift register part forming the gate line driving circuit. FIG. 4 is a circuit diagram showing the structure of one stage (a unit shift register) SRn of the shift register part forming the gate line driving circuit. The shift register part shown in FIG. 3 includes n vertically connected unit shift registers SR1, SR2, SR3, . . . , SRn and a dummy unit shift register SRD provided in a stage subsequent to the unit shift register SRn of the last stage (the unit shift registers SR1, SE2, . . . , SRD are generally named as a "unit shift register SR", hereinafter). The unit shift registers SR respectively include the circuit structure shown in FIG. 4.

A clock generator 31 shown in FIG. 3 supplies clock signals CLKA and CLKB of two phases opposite to each other (activation periods are not overlapped) to the plurality of unit shift registers SR. In the gate line driving circuit 160, the clock signals CLKA and CLKB are controlled to be activated in order at a timing synchronizing with a scanning period of the display device 400.

As shown in FIGS. 3 and 4, each unit shift register SR includes four TFTs shown by transistors Q1 to Q4, a capacity element C1, an input terminal IN1, an output terminal OUT, a clock terminal CK1 and a reset terminal RST. Further, to each unit shift register SR, a low potential side source potential VSS (=0V: ground potential) is supplied through a first power supply terminal S1, and a positive side source potential VDD is supplied through a second power supply terminal S2 respectively (not shown in FIG. 3).

As shown in FIG. 4, an output stage of the unit shift register SR is formed by the transistor Q1 connected between the output terminal OUT and the clock terminal CK1 and the transistor Q2 connected between the output terminal OUT and the first power supply terminal S1. Namely, the transistor Q1 is a transistor (a first transistor) for supplying the clock signal CLKA inputted to the clock terminal CK1 to the output terminal OUT, and the transistor Q2 is a transistor (a second transistor) for discharging the output terminal OUT. Now, a node to which a gate (a control electrode) of the transistor Q1 is connected is defined as a "node N1" and a node to which a gate of the transistor Q2 is connected is defined as a "node N2".

In a part between the gate and the source of the transistor Q1 (that is, between the node N1 and the output terminal OUT), the capacity element C1 is provided. The capacity element C1 is an element (a boot strap capacity) that carries out a capacity coupling between the output terminal OUT and the node N1 to boost the node N1 in accordance with the rise of the level of the output terminal OUT. However, when a capacity between the gate and a channel of the transistor Q1 is sufficiently large, the capacity element C1 can be replaced by that capacity, in such a case, the capacity element C1 may be omitted.

In a part between the node N1 and the second power supply terminal S2, the transistor Q3 whose gate is connected to the input terminal IN1 is connected. Further, in a part between the node N1 and the first power supply terminal S1, the transistor Q4 whose gate is connected to the reset terminal RST is connected. Namely, the transistor Q3 forms a charging circuit for charging the node N1 in accordance with a signal inputted to the input terminal IN1, and the transistor Q4 forms a discharging circuit for discharging the node N1 in accordance with a signal inputted to the reset terminal RST. Further, the gate (the node N2) of the transistor Q2 is also connected to the reset terminal RST.

As shown in FIG. 3, to the input terminal IN1 of each unit shift register SR, the output terminal OUT of the unit shift register of a preceding stage is connected. In this case, to the input terminal IN1 of the unit shift register SR1 of the first stage, a prescribed start pulse ST is inputted. Further, to the clock terminal CK1 of each unit shift register SR, one of the above-described clock signals CLKA and CLKB is inputted so that the clock signals of different phases from each other are inputted to the vertically adjacent unit shift registers SR.

Then, to the reset terminal RST of each unit shift register SR, the output terminal OUT of the unit shift register SR of a subsequent stage thereto is connected. However, to the reset terminal RST of the dummy unit shift register SRD provided in the next stage of the unit shift register SRn of the last stage, a prescribed end pulse EN is inputted. In the gate line driving circuit, the start pulse ST and the end pulse EN are respectively inputted at timings corresponding to the first and the last of each frame period of an image signal.

Now, an operation of each unit shift register SR shown in FIG. 4 will be described below. Basically, since all the unit shift registers SR of the stages respectively similarly operate, here, the operation of the unit shift register SRk of a k th stage of multi-stage shift registers will be representatively described. The clock signal CLKA is supposed to be inputted to the clock terminal CK1 of the unit shift register SRk (for instance, the unit shift registers SR1 and SR3 or the like shown in FIG. 3 correspond thereto).

Here it is assumed that a potential of an H level of the clock signals CLKA and CLKB is VDD (a positive side source potential) and a potential of an L level is VSS (a ground potential). Further, a threshold value voltage of each transistor Qx forming the unit shift register SR is represented by Vth (Qx).

Figure 5:
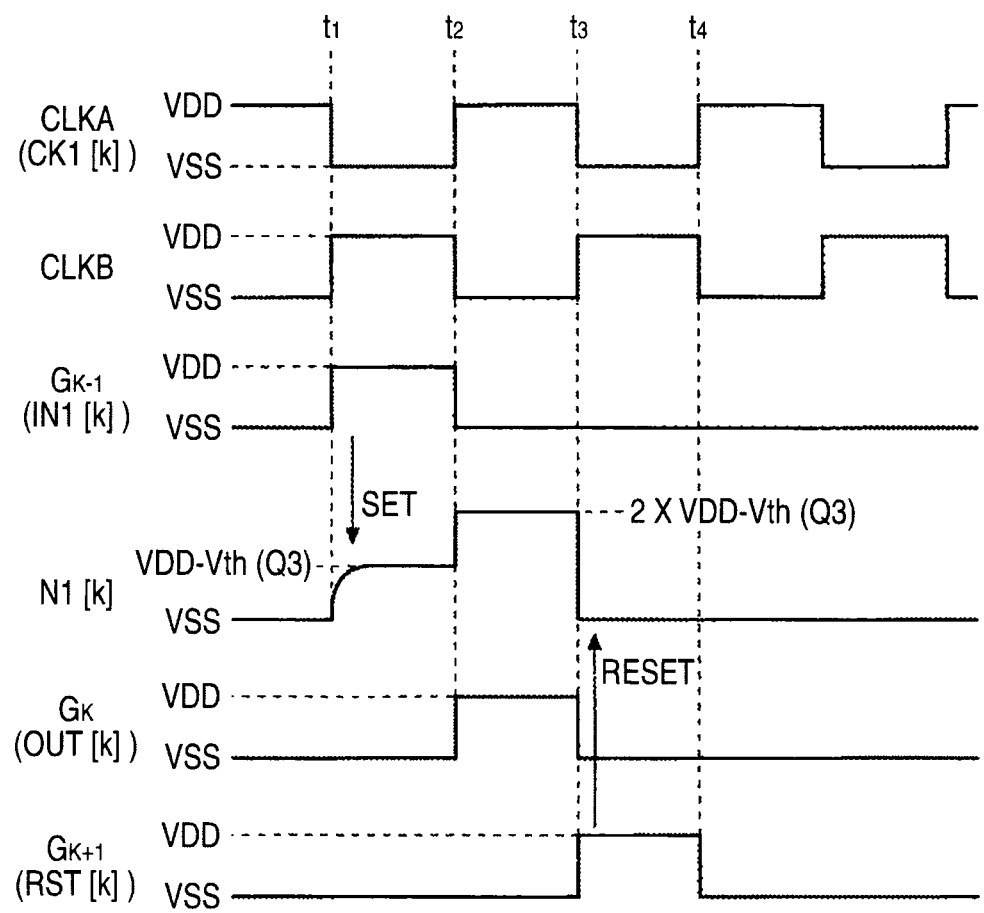
FIG. 5 is a timing chart showing an operation of a unit shift register shown in FIG. 3.

FIG. 5 is a timing chart showing the operation of the unit shift register SRk (FIG. 4). Initially, as an initial state of the unit shift register SRk, it is assumed the node N1 is in a state of an L level (refer the state that the node N1 is in a state of an L level to as a "reset state" hereinafter). Further, it is assumed that the input terminal IN1 (an output signal Gk−1 of a preceding stage), the reset terminal RST (an output signal of Gk+1 of a next stage) and the clock terminal CK1 (the clock signal CLKA) are all in the states of L levels. At this time, since both the transistors Q1 and Q2 are turned off, the output terminal OUT is in a state of a high impedance (a floating state), however, in the initial state, it is assumed that the output terminal OUT (an output signal Gk) is also in a state of an L level.

At a time t1 from the above-described state, when the clock signal CLKA changes to the L level, the clock signal CLKB changes to the H level and the output signal Gk−1 of the preceding stage (in the case of the first stage, the start pulse ST) becomes the H level, the transistor Q3 of the unit shift register SRk is turned on and the node N1 is charged to become the H level (refer the state that the node N1 is in a state of the H level to as a "set state", hereinafter). At this time, the potential level of the node N1 (refer it to simply as to a "level", hereinafter) rises to VDD−Vth (Q3). Accordingly, the transistor Q1 is turned on.

Then, at a time t2, the clock signal CLKB changes to the L level, the clock signal CLKA changes to the H level and the output signal Gk−1 of the preceding stage becomes the L level. Then, the transistor Q3 is turned off and the node N1 is maintains the H level to be in the floating state. Further, since the transistor Q1 is turned on, the level of the output terminal OUT rises following the clock signal CLKA.

When the levels of the clock terminal CK1 and the output terminal OUT rise, the level of the node N1 is boosted by a connection through the capacity element C1 and a capacity between the gate and a channel of the transistor Q1 as shown in FIG. 5. Since a boost quantity at this time substantially corresponds to the amplitude (VDD) of the clock signal CLKA, the node N1 is boosted about to 2×VDD−Vth (Q3).

As a result, while the output signal Gk is in a state of the H level, a voltage between the gate (the node N1) and the source (the output terminal OUT) of the transistor Q1 is maintained to be high. That is, since an on-resistance of the transistor Q1 is maintained to be low, the output signal Gk rises at high speed to become the H level following the clock signal CLKA. Further, at this time, since the transistor Q1 operates in a linear area (non-saturated area), the level of the output signal Gk rises to VDD the same as the amplitude of the clock signal CLKA.

Further, at a time t3, when the clock signal CLKB changes to the H level and the clock signal CLKA changes to the L level, the on-resistance of the transistor Q1 is also maintained to be low and the output signal Gk falls at high speed to return to the L level following the clock signal CLKA.

Further, at the time t3, since the output signal Gk+1 of the next stage becomes the H level, the transistors Q2 and Q4 of the unit shift register SRk are turned on. Thus, the output terminal OUT is sufficiently discharged through the transistor Q2 to assuredly become the L level (VSS). Further, the node N1 is discharged by the transistor Q4 to become the L level. That is, the unit shift register SRk returns to the reset state.

Then, at a time t4, after the output signal Gk+1 of the next stage returns to the L level, the unit shift register SRk is maintained to be in the reset state and the output signal Gk is maintained to be in the L level until the output signal Gk−1 of the preceding stage is subsequently inputted.

In summarizing the above-described operations, during a period that the signal (the start pulse SP or the output signal Gk−1 of the preceding stage) is not inputted, since the unit shift register SRk is in the reset state and the transistor Q1 maintains a turned off state, the output signal Gk is maintained to be in the L level (VSS). Then, when the signal is inputted to the input terminal IN1, the unit shift register SRk is switched to the set state. Under the set state, since the transistor Q1 is turned on, while the signal of the clock terminal CK1 (the clock signal CLKA) becomes the H level, the output signal Gk becomes the H level. Then, after that, when the signal (the output signal Gk+1 of the next stage or the end pulse EN) is inputted to the reset terminal RST, the unit shift register returns to an original reset state.

Now, an operation of a multistage shift register part in which a plurality of the unit shift registers SR are cascade connected will be described by referring to FIG. 6 as a timing chart showing the operation of the gate line driving circuit. Initially, when the start pulse ST is inputted to the unit shift register SR1 of the first stage, output signals G are shifted, by taking advantage of it (as a trigger), at timings synchronously with the clock signals CLKA and CLKB and transmitted in order to the unit shift registers SR1, SR2, SR3 . . . , a shown in FIG. 6. In the gate line driving circuit 160, the output signals G outputted in order in such a way are used as horizontal (or vertical) scanning signals of the display panel.

A period during which a specific unit shift register SR outputs the output signal G is called a "selecting period" of the unit shift register SR, hereinafter.

The dummy unit shift register SRD is provided in order to reset the unit shift register SRn by an output signal GD thereof immediately after the unit shift register SRn of the last stage outputs an output signal Gn. For instance, in the gate line driving circuit, when the unit shift register SRn of the last stage is not reset immediately after the unit shift register SRn outputs the output signal Gn, the gate line (the scanning line) corresponding thereto is unnecessarily activated to cause an inconvenience of a display.

The dummy unit shift register SRD is reset by the end pulse EN inputted at timing immediately after the dummy unit shift register outputs the output signal GD. When the shift operations of the signals are repeatedly carried out as in the gate line driving circuit, a start pulse SP of a next frame period may be used in place of the end pulse EN.

Figure 6:
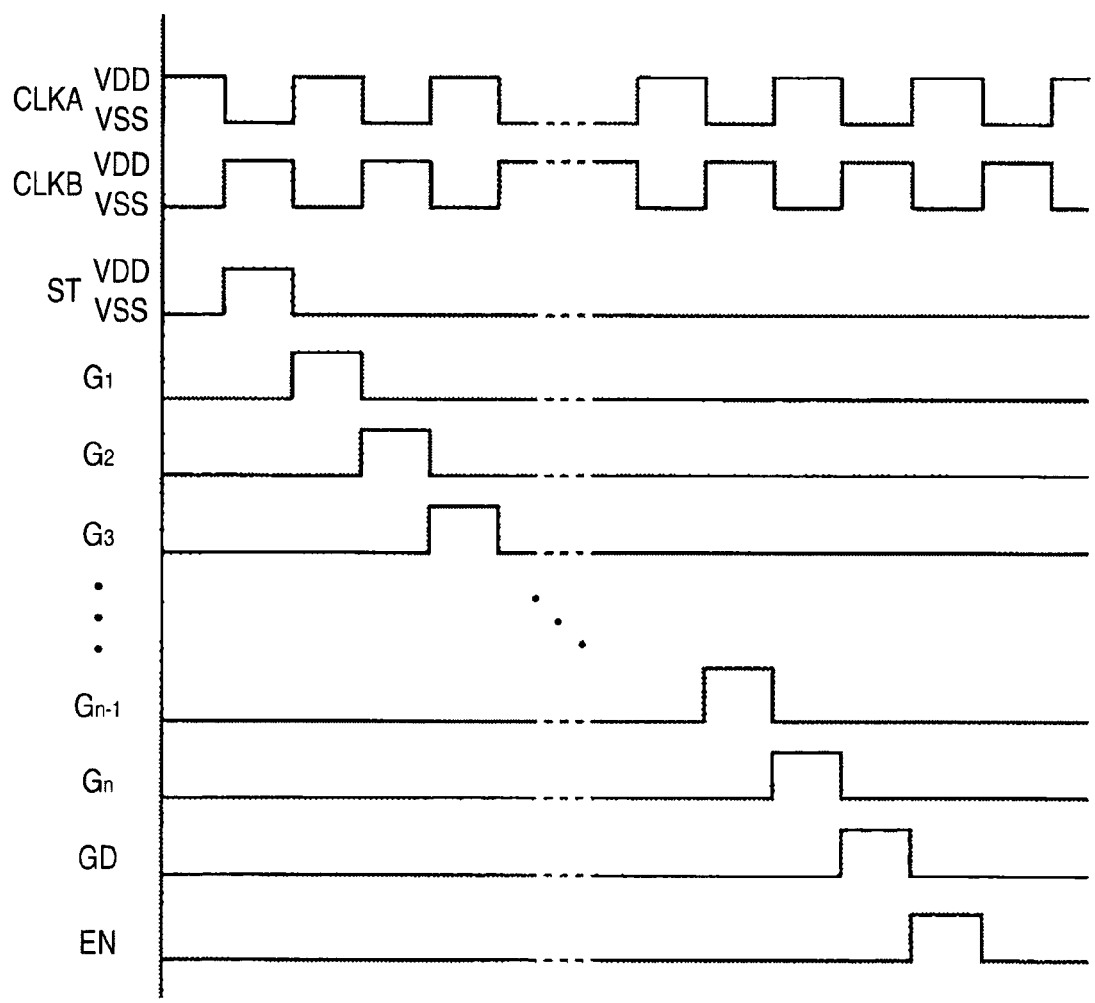
FIG. 6 is a timing chart showing an operation of a scanning line driving circuit shown in FIG. 1.

In the case of a driving operation using the two phase clocks as shown in FIG. 3, since the unit shift registers SR are respectively reset by the output signals G of the subsequent stages thereto, unless the unit shift registers SR of the next stages operate at least once, such ordinary operations as shown in FIGS. 5 and 6 cannot be realized. Accordingly, before the ordinary operation, a dummy operation that dummy signals are transmitted from the first stage to the last stage needs to be carried out. Otherwise, a resetting transistor may be separately provided between the reset terminal RST (the node N2) of each unit shift register SR and the second power supply terminal S2 (a high potential side power source) to carry out a reset operation that forcedly allows the node N2 to become the H level before the ordinary operation. However, in this case, a resetting signal line is separately required.

Figure 7:
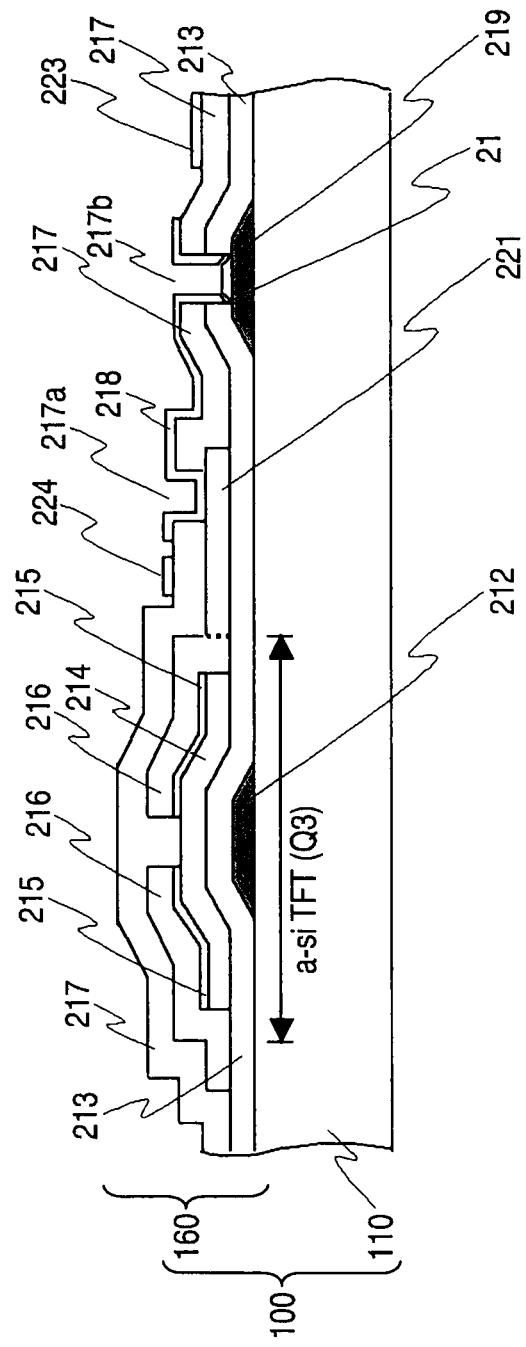
FIG. 7 is a partly sectional view including a TFT of a shift register circuit shown in FIG. 4.

FIG. 7 is a sectional view showing, in an enlarged form, an area corresponding to a part of the circuit including a TFTQ1 in the gate line driving circuit 160 on the array substrate 100 (a circuit surrounded by a broken line in FIG. 4). In the array substrate 100, a gate electrode 212 made of an electrically conductive material such as metal is formed on the transparent first substrate 110, and the gate electrode 212 is covered with a gate insulating film 213 made of a silicon nitride film (SiNx) or a silicon oxide film (SiO2) thereon.

On the gate insulating film 213 in the upper part of the gate electrode 212, an active layer 214 made of amorphous silicon is formed and an ohmic contact layer 215 made of amorphous silicon doped with impurities is formed thereon.

On the upper part of the ohmic contact layer 215, a source and drain electrode 216 made of an electrically conductive material such as metal is formed. The source and drain electrode 216 forms the TFT (Q1) together with the gate electrode 212. Though not shown in the drawing, the gate electrode 212 is connected to a gate wiring 219 for connecting together the nodes respectively in the gate line driving circuit. Similarly, the source and drain electrode 216 is connected to a source and drain wiring 221 for connecting together the nodes respectively in the gate line driving circuit.

The above-described term "gate wiring" means a "wiring using the same layer as that of the gate electrode of the TFT" and is not necessarily connected to the gate electrode of the TFT. Further, the "source and drain wiring" is the same as the above.

Subsequently, on the source drain electrode 216, a protecting layer 217 made of the silicon nitride film, the silicon oxide film or an organic insulating film is formed. The protecting layer 217 has a contact holes 217a and 217b (either of them is designated as a first contact hole) in which the source and drain wiring and the gate wiring are exposed.

On the upper art of the protecting layer 217, a transparent conductive film 218 is formed. The transparent conductive film 218 connects the source drain wiring 221 to the gate wiring 219 through the contact holes 217a and 217b. In the step parts of the contact holes, an imperfect coverage 21 occurs.

Figure 8:
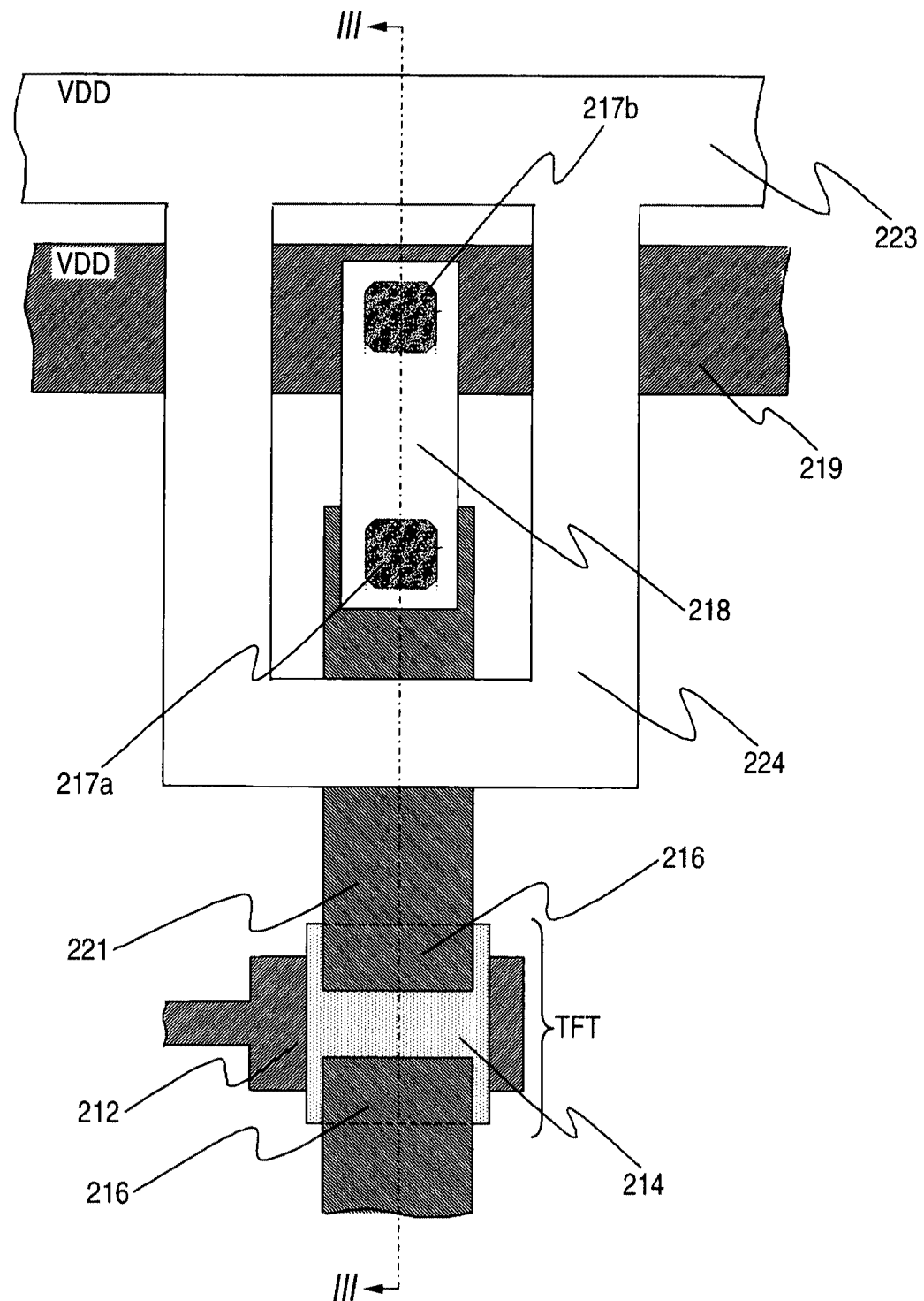
FIG. 8 is a plan view of a part in the vicinity of a contact hole of a shift register circuit according to the first embodiment of the present invention.

FIG. 8 shows a plan view of a contact hoe part as a main part of this embodiment. To the gate wiring 219, a VDD potential as the positive side source potential in the gate line driving circuit 160 is supplied (FIG. 7 is a sectional view taken along a line III-III in FIG. 8). In order to connect the contact hole 217b to the contact hole 217a, the transparent conductive film 218 shown in FIG. 8 is configured in a rectangular form (a first pattern form) so as to cover both the contact holes. Thus, the source drain wiring 221 is electrically conducted to the gate wiring 219 to realize the conversion of a wiring layer between both the wirings. The source and drain electrode 221 becomes the source and drain electrode 216 of the TFT.

A bus wiring 223 is made of a transparent conductive film formed with an ITO and arranged from a lowermost part to an uppermost part of the driving circuit to feed a power. The bus wiring 223 functions as an example of an electrically conductive oxide film for a bus wiring. A sacrifice electrode 224 is similarly formed with a transparent conductive film, extended so as to protrude in the shape of T from the bus wiring 223 at two positions in the vicinity of the contact hole and arranged in a form (a second pattern form) that surrounds the contact holes 217a and 217b and the transparent conductive film 218. To the bus wiring 223 and the sacrifice electrode 224, the VDD potential is supplied similarly to the gate wiring 219.

Now, a reason why corrosion is suppressed in this embodiment will be described below.

Thought not shown in the drawing, in the vicinity of the contact holes 217a and 217b to which a high potential (here, the positive side source potential VDD and a maximum source potential in the gate line driving circuit) is applied, other contact hole (designated as a second contact hole) exists to which a low potential (for instance, a ground potential VSS) is applied. When the gate line driving circuit is placed in an environment of high temperature and high humidity, water enters through the seal material 350. Under this state, when the driving circuit is operated, electrolysis arises between the contact holes to which the high potential is applied and the contact hole to which the low potential is applied due to impurity ions located inside the seal material 350. In the contact holes to which the high potential is applied, an oxidation reaction occurs so that the metal exposed by the imperfect coverage 21 of the contact hole is dissolved in positive ions to cause the corrosion.

In this embodiment, since the periphery of the contact holes is surrounded by the transparent conductive film (the sacrifice electrode 224) to which the positive side source potential VDD is applied, the above-described oxidation reaction arises in the transparent conductive film and does not occur in the contact holes, so that the corrosion of the metal exposed due to the imperfect coverage of the contact holes 217a and 217b does not arise.

Further, since the ITO forming the transparent conductive film (the sacrifice electrode 224) is an electrically conductive oxide film, the corrosion does not occur. In such a way, in the contact holes 217a and 217b to which the high potential is applied, the electrolysis does not arise and the occurrence of the corrosion is suppressed.

Further, the contact holes surrounded by the sacrifice electrode 224 may not be not only contact holes to which the high potential is constantly applied (in view of DC), but also contact holes to which the low potential and the high potential are repeatedly applied. In the contact holes to which the low potential and the high potential are repeatedly applied, the corrosion arises (when a period of the high potential is longer, the degree of the corrosion is the heavier. When the contact holes are surrounded by the sacrifice electrode 224, the occurrence of the corrosion is similarly suppressed.

In this embodiment, the potential (this potential is designated as VS) applied to the transparent conductive film (the sacrifice electrode 224) is the same potential as the positive side source potential VDD as the maximum source potential in the scanning line driving circuit. Further, VS is more preferably the positive side source potential or higher.

In contrast, when the potential of the transparent conductive film (=the sacrifice electrode 224) in the circuit is VDD or lower, the electrolysis arises between the transparent conductive film and the contact holes to which the high potential (VDD) is applied, so that there is a fear that the corrosion may possibly arise in the contact holes. Assuming that the potential of the transparent conductive film is VH, and a potential difference in which the corrosion arises is Va, when VDD−VH is smaller than Va, the corrosion does not happen so that a problem does not arise. (Va is about 5 volt.)

In applying the potential to the bus wiring 223, an external terminal (not shown in the drawing) for supplying a signal to the array substrate is desirably formed by using the transparent conductive film such as the ITO and directly connected to the bus wiring. Incidentally, the bus wiring 223 is configured in a pattern form integrally formed with the external terminal for supplying the signal to the array substrate.

In this case, the external terminal for supplying the signal to the array substrate may be converted to a metal wiring once, and then, converted to an electrically conductive oxide film such as the ITO through the contact hole in an area where the corrosion hardly arises.

The area where the corrosion hardly arises is specifically an area located in the seal material, near to the display area and separate from the seal material.

In this embodiment, as an example that realizes the conversion of the wiring layers of the source drain wiring 221 and the gate wiring 219 through the contact holes, a case is exemplified that the transparent conductive film is formed which has the rectangular form (the first pattern form) so as to cover the contact holes. However, as the form for covering the contact holes, the rectangular form is not necessarily employed, and various modified examples may be considered. For instance, a two-step form may be employed in which the contact hole 217b on the gate line is included in the contact hole 217a of the source and drain wiring 221 and the transparent conductive film may be configured to a circular form.

Likewise, the sacrifice electrode 224 may be configured in such a form as to surround the contact holes and does not necessarily have a rectangular form.

Second Embodiment

Figure 9:
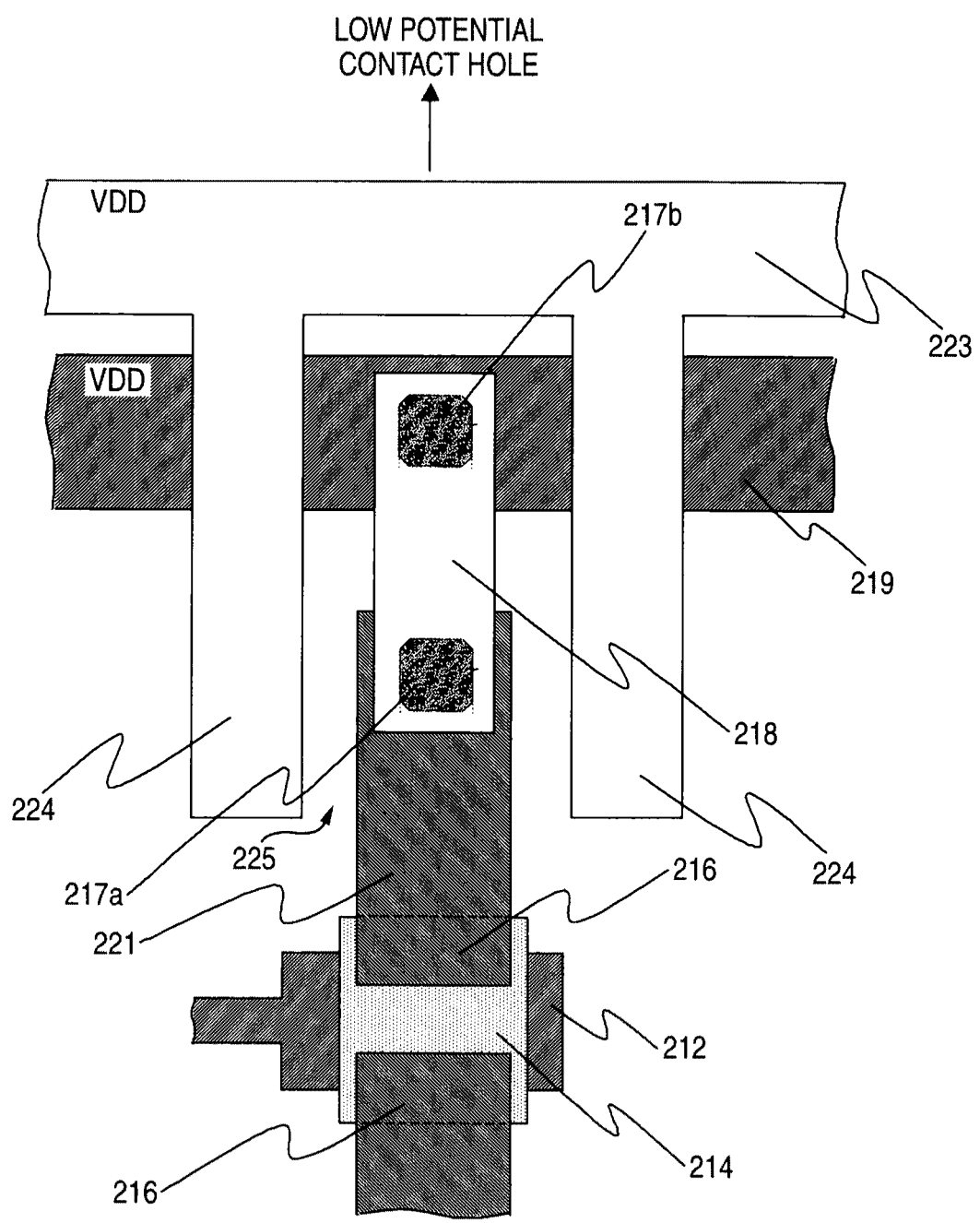
FIG. 9 is a plan view of a part in the vicinity of a contact hole of a shift register circuit according to the second embodiment of the present invention.

In a second embodiment, instead of an arrangement example (FIG. 8) of the sacrifice electrode 224 described in the first embodiment, a plan view of a periphery of contact holes is shown in FIG. 9. Since other structures are the same as those of the first embodiment, an explanation thereof will be omitted to avoid a description from being redundant.

In FIG. 8 in the first embodiment, the sacrifice electrode is arranged so as to surround the periphery of the contact holes 217a and 217b (either of them is designated as the first contact hole) to which the high potential VDD is applied and the transparent conductive film 218, however, in this embodiment, a part of the sacrifice electrode 224 extended so as to protrude in the shape of T from the bus wiring 223 is cut to provide an opening part 225. Thus, the sacrifice electrode 224 surrounds the contact holes and the transparent conductive film from three directions.

Further, in this embodiment, other contact hole (designated as a second contact hole) to which a low potential (for instance, VSS) is applied is provided in the upper part of the drawing (not shown in the drawing). Thus, a electric field generated between the contact hole (the above-described first contact hole) to which the high potential (VDD) is applied and the contact hole (not shown in the drawing: the above-described second contact hole) to which the low potential is applied is generated in the upper part of the sacrifice electrode 224 (direction shown by an arrow mark in FIG. 9). Accordingly, even when the sacrifice electrode in an opposite side of the contact hole to which the low potential is applied is not provided, the same corrosion preventing effect as that obtained when the sacrifice electrode is provided can be obtained.

Further, as in this embodiment, in the pattern form of the sacrifice electrode 224, a U shaped pattern form (a third pattern form) is employed in which a part of a remote side from the contact hole (the second contact hole) to which the low potential is applied is cut out to provide the opening part 225. Thus, a layout area in this part is not necessary so that the layout area can be reduced. Further, since an intersecting part of a source and drain wiring 221 and the sacrifice electrode 224 is eliminated, the stray capacity of the source and drain wiring 221 can be reduced.

Third Embodiment

Figure 10:
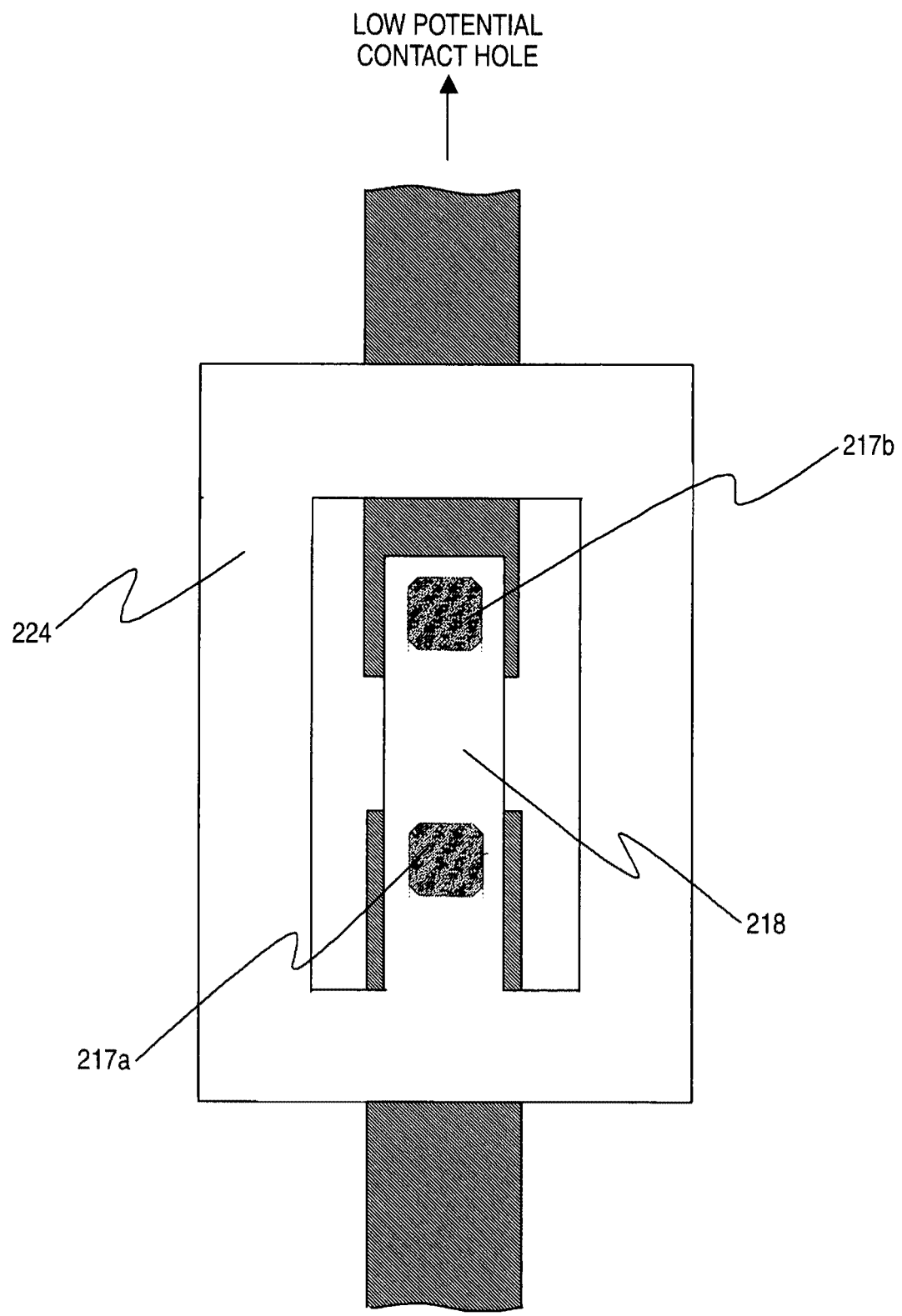
FIG. 10 is a plan view of a part in the vicinity of a contact hole of a shift register circuit according to the third embodiment of the present invention.

FIG. 10 shows a plan view of a contact hole part in a third embodiment. In the first embodiment shown in FIG. 8, the sacrifice electrode 224 is connected to the bus wiring 223 to supply the high potential, however, in this embodiment, a potential to be applied to a sacrifice electrode 224 formed with a transparent conductive film such as an ITO is applied by connecting the sacrifice electrode 224 to a transparent conductive film 218 of the contact hole part. Since other structures are the same as those of the above-described first embodiment, an explanation thereof will be omitted to avoid a description from being redundant.

When the potential is applied to the sacrifice electrode from the bus wiring, if the bus wiring is separate from the contact hole, since the transparent conductive film needs to be arranged to a part near the contact hole from the bus wiring, a large layout area is required. Especially, in the case of a display device of a narrow pitch (high resolution), a circuit area is enlarged so that a desired narrow pitch is hardly obtained.

In this embodiment, since the potential applied to the sacrifice electrode 224 arranged so as to surround the periphery of contact holes 217a and 217b (either of them is designated as a first contact hole) and the transparent conductive film 218 is applied from the contact hole part, the layout area can be narrowed. That is, the sacrifice electrode 224 is configured as a pattern form integrally formed with the transparent conductive film 218.

A connecting part of the transparent conductive film 218 of the contact hole part and the sacrifice electrode 224 is located in an opposite side (a lower side in FIG. 10, that is, a position the remotest from a second contact hole) to other contact hole (not shown in the drawing: in FIG. 10, an upper side, that is, located in a direction shown by an arrow mark and designated as the second contact hole) to which a low potential is applied. The first contact hole that may be possibly corroded when the second contact hole is connected to the first contact hole is surrounded by the sacrifice electrode 224 relative to the second contact hole, so that the contact hole part is stronger to the corrosion. That is, the sacrifice electrode 224 is connected to the transparent conductive film 218 at a connected part by a pattern extended from the transparent conductive film 218 so as to be formed integrally with the transparent conductive film 218, and the connected part is formed at the remotest position from the second contact hole.

Fourth Embodiment

Figure 11:
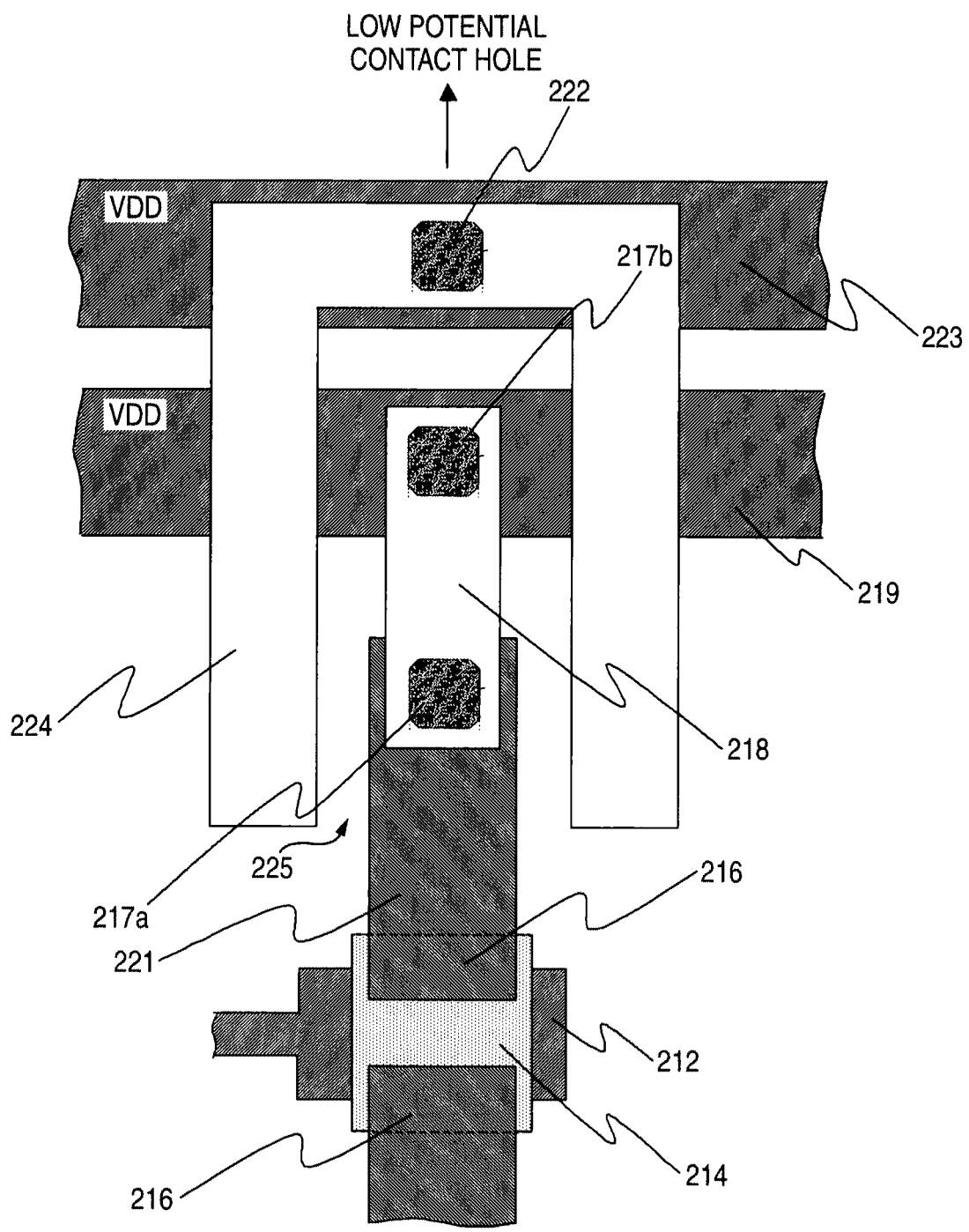
FIG. 11 is a plan view of a part in the vicinity of a contact hole of a shift register circuit according to the fourth embodiment of the present invention.

FIG. 11 shows a plan view of a contact hole part in a fourth embodiment. In the second embodiment shown in FIG. 9, the bus wiring 223 is formed with the same transparent conductive film as that of the sacrifice electrode 224. However, in the fourth embodiment, as a bus wiring 223, a metal wiring formed with a metal film is used. Since other structures are the same as those of the above-described second embodiment, an explanation thereof will be omitted to avoid a redundancy.

As shown in FIG. 11, a sacrifice electrode 224 is connected to the bus wiring 223 through a contact hole 222 (a third contact hole) and a high potential (VDD) is supplied thereto. Since the thickness of a transparent conductive film such as an ITO is small as thin as about 10 nm and the transparent conductive film is provided in an uppermost layer in structure and inferior in its coverage property, a step cut and disconnection may possibly arise in an area crossing other metal wiring.

In this embodiment, since the metal wiring is used as the bus wiring 223, the step cut and disconnection is suppressed. In the contact hole 222, corrosion may possibly arise due to an electrolysis, however, the contact hole 222 is not related to the operation of a driving circuit. Even when the contact hole 222 is corroded, the operation of the driving circuit is not affected thereby. The metal wiring (the bus wiring 223) may be a gate wiring or a source and drain wiring.

Fifth Embodiment

Figure 12:
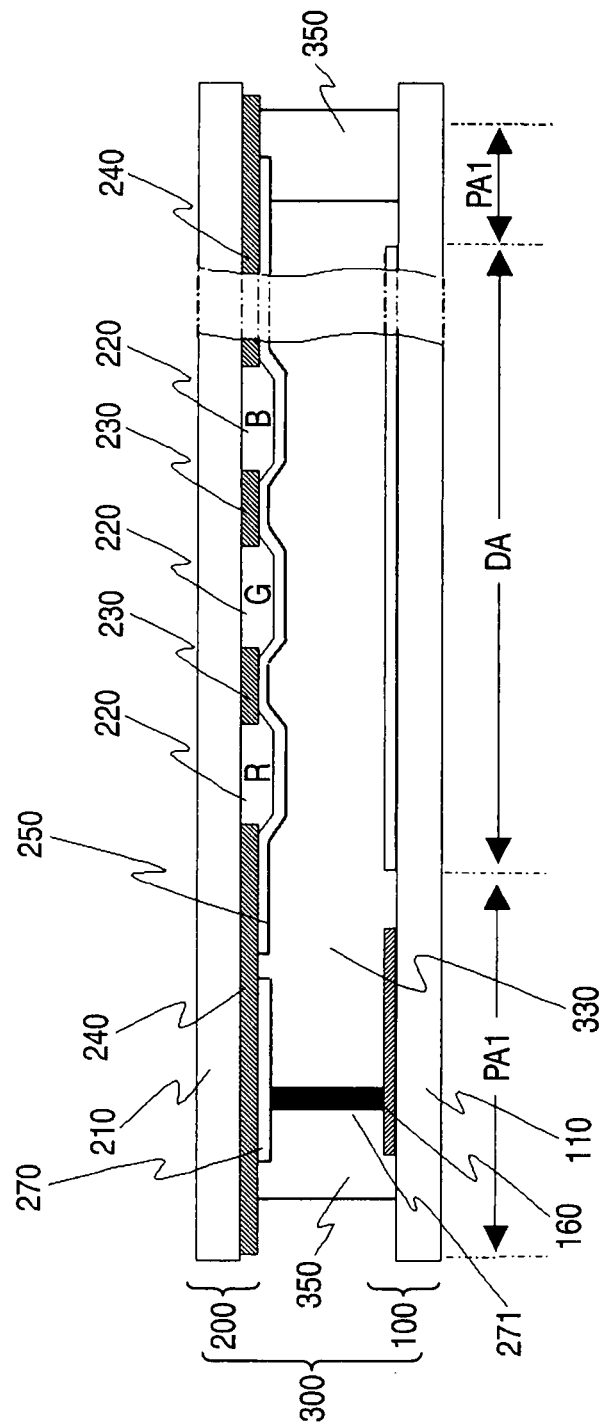
FIG. 12 is a sectional view of a liquid display device according to the fifth embodiment of the present invention.

FIG. 12 shows a sectional view of a display device 400 according to a fifth embodiment. As compared with the first embodiment shown in FIG. 2, in FIG. 12, a transparent electrode on a color filter substrate 200 is patterned to separate a transparent electrode 250 in a display area DA from a transparent electrode 270 located above a gate line driving circuit 160 and in the vicinity of a seal position and a seal material 350, and a high potential (VDD) is applied to the separated transparent electrode 270 provided above the gate line driving circuit 160 and in the vicinity of the seal position and the seal material 350 through a VDD transfer 271. That is, the transparent electrode 270 is formed in a frame area located outside the display area DA. Since other structures are the same as those of the above-described first embodiment, an explanation thereof will be omitted to avoid a redundancy.

Here, a distance between a contact hole (not shown in the drawing) provided in the gate line driving circuit 160 to which a positive side source potential VDD is applied and a contact hole (not shown in the drawing) to which a low potential (for instance, a ground potential VSS) is applied is about 15 μm at the minimum. In contrast, a distance between an array substrate 100 and the color filter substrate 200 is about 4 μm. Accordingly, an electric field between the low potential contact hole and the high potential contact hole provided in the gate line driving circuit 160 is mitigated and the electric field is concentrated on a part between the low potential contact hole and the transparent electrode 270 on the color filter substrate 200 to which the high potential is applied.

As a result, in the high potential contact hole, the electrolysis does not arise and the corrosion is suppressed. According to this embodiment, a sacrifice electrode does not need to be formed in the driving circuit, which is advantageous for forming a narrow frame.

In the above-described first to fifth embodiments, a Twisted Nematic (TN) type liquid crystal display device is exemplified and the structures of the scanning line driving circuit are described, however, a In Plane Switching (IPS) type liquid display device may be employed. In this case, a transparent electrode on a display area is not provided.

Further, as the transparent conductive film, the ITO is exemplified and described as one example of the electrically conductive oxide film. However, for instance, other electrically conductive oxide film such as Indium Zinc Oxide (IZO) may be employed.

Further, structural examples (pattern forms or wiring methods) of the sacrifice electrode described in the embodiments respectively may be suitably combined together. Thus, the scanning line driving circuit can be obtained that is smaller in the total layout area of the sacrifice electrode and advantageous for forming a narrow frame.

Further, in the above-described first and fourth embodiments, the scanning line driving circuit used in the image display device is exemplified and explained, however, a device that uses an active matrix circuit such as an x ray detector circuit may employ the scanning line driving circuit of the present invention without being limited to the display device.

What is claimed is:

1. A scanning line driving circuit for an active matrix formed on an array substrate, the scanning line driving circuit comprising:
    a first contact hole formed in the scanning line driving circuit;
    one electrically conductive oxide film formed to be connected to the first contact hole and occupying a first pattern form so as to cover the first contact hole; and
    another electrically conductive oxide film formed simultaneously with the one electrically conductive oxide film and occupying a second pattern form,
    wherein the other electrically conductive oxide film is formed so as to surround a periphery of the one electrically conductive oxide film.

2. The scanning line driving circuit for an active matrix according to claim 1, wherein a potential of the highest source voltage of the scanning line driving circuit is supplied to the first contact hole.

3. The scanning line driving circuit for an active matrix according to claim 1, wherein a potential not lower than a potential supplied to the first contact hole is supplied to the other electrically conductive oxide film.

4. The scanning line driving circuit for an active matrix according to claim 1, wherein the other electrically conductive oxide film is not connected to the one electrically conductive oxide film.

5. The scanning line driving circuit for an active matrix according to claim 1, further comprising:
    a second contact hole to which a potential lower than a potential supplied to the first contact hole is supplied,
    wherein the one electrically conductive oxide film has its periphery surrounded by the other electrically conductive oxide film occupying a third pattern form which has an opening part and surrounds the first contact hole from three directions, and
    wherein the opening part is formed at the remotest position from the second contact hole.

6. The scanning line driving circuit for an active matrix according to claim 1, further comprising:
    an electrically conductive oxide film for a bus wiring that supplies a potential to the other electrically conductive oxide film,
    wherein the electrically conductive oxide film for the bus wiring is extended in a shape of T to form the other electrically conductive oxide film.

7. The scanning line driving circuit for an active matrix according to claim 6, wherein the electrically conductive oxide film for the bus wiring is configured in a pattern form integrally formed with an external terminal for supplying a signal to the array substrate.

8. The scanning line driving circuit for an active matrix according to claim 6, wherein the electrically conductive oxide film for the bus wiring is connected to the other electrically conductive oxide film through a converting part in a seal from an external terminal for supplying a signal to the array substrate.

9. The scanning line driving circuit for an active matrix according to claim 1, further comprising:
    a bus wiring that supplies a potential to the other electrically conductive oxide film,
    wherein the bus wiring is formed with a metal film.

10. The scanning line driving circuit for an active matrix according to claim 1, wherein the other electrically conductive oxide film is configured as a pattern form integrally formed with the one electrically conductive oxide film.

11. The scanning line driving circuit for an active matrix according to claim 10, further comprising:
    a second contact hole to which a potential lower than a potential supplied to the first contact hole is supplied,
    wherein the other electrically conductive oxide film is connected to the one electrically conductive oxide film at a connected part by a pattern extended from the one electrically conductive oxide film so as to be formed integrally with the one electrically conductive oxide film, and
    wherein the connected part is formed at the remotest position from the second contact hole.

12. The scanning line driving circuit for an active matrix including the scanning line driving circuit according to claim 1, wherein a transistor forming the scanning line driving circuit is an amorphous silicon thin film transistor.

13. An image display device including:
an array substrate having a matrix display area;
a color filter substrate that is opposed to the array substrate to sandwich an electro-optical material therebetween;
a scanning line driving circuit formed on the array substrate;
a transparent electrode formed in a frame area located outside the matrix display area and having a potential supplied from the array substrate,
wherein the transparent electrode is formed on a surface of the color filter substrate opposed to the array substrate so as to cover the scanning line driving circuit, and
wherein the potential is not lower than a maximum potential supplied to a first contact hole in the scanning line driving circuit.

14. The image display device according to claim 13, wherein the scanning line driving circuit includes
one electrically conductive oxide film connected to the first contact hole, and
another electrically conductive oxide film formed so as to surround a periphery of the one electrically conductive film.

\* \* \* \* \*